United States Patent [19] [11] Patent Number: 4,904,868
Kohda et al. [45] Date of Patent: Feb. 27, 1990

| | | |
|---|---|---|
| [54] | RADIATION IMAGE READ-OUT APPARATUS AND STIMULABLE PHOSPHOR SHEET COMPOSITE MEMBER FOR THE SAME | |
| [75] | Inventors: | Katsuhiro Kohda; Chiyuki Umemoto; Nobuyoshi Nakajima; Kazuo Horikawa, all of Kaisei, Japan |
| [73] | Assignee: | Fuji Photo Film Co., Ltd., Kanagawa, Japan |
| [21] | Appl. No.: | 232,906 |
| [22] | Filed: | Aug. 16, 1988 |

[30] Foreign Application Priority Data

| Aug. 19, 1987 | [JP] | Japan | 62-205876 |
|---|---|---|---|
| Aug. 19, 1987 | [JP] | Japan | 62-205877 |
| Aug. 19, 1987 | [JP] | Japan | 62-205878 |
| Aug. 19, 1987 | [JP] | Japan | 62-205879 |
| Aug. 19, 1987 | [JP] | Japan | 62-205880 |
| Aug. 27, 1987 | [JP] | Japan | 62-213751 |
| Aug. 27, 1987 | [JP] | Japan | 62-213752 |

[51] Int. Cl.[4] ............................................. G03B 42/02
[52] U.S. Cl. ................................ 250/327.2; 250/484.1
[58] Field of Search ........................ 250/327.2, 484.1 B

[56] References Cited

U.S. PATENT DOCUMENTS

| 4,258,264 | 3/1981 | Kotera et al. | 250/484.1 |
|---|---|---|---|
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,603,253 | 7/1986 | Nakagawa | 250/327.2 |
| 4,603,260 | 7/1986 | Takano | 250/484.1 |
| 4,802,618 | 2/1989 | Seto et al. | 229/68 R |

FOREIGN PATENT DOCUMENTS

| 0129109 | 5/1984 | European Pat. Off. . |
|---|---|---|
| 0125800 | 11/1984 | European Pat. Off. . |
| 0126218 | 11/1984 | European Pat. Off. . |
| 56-11395 | 2/1981 | Japan | 250/327.2 |

Primary Examiner—Constantine Hannaher
Attorney, Agent, or Firm—Sixbey, Friedman, Leedom & Ferguson

[57] ABSTRACT

A radiation image read-out apparatus comprises a light shielding material removal section for removing a light shielding material by dissolution or separation from a stimulable phosphor sheet comprising a stimulable phosphor layer and the light shielding material which is provided at least on a surface on the stimulable phosphor layer side and which is removable by dissolution in a solvent or by physical separation, the stimulable phosphor sheet carrying a radiation image stored on the stimulable phosphor layer. A read-out section is provided for reading out the radiation image by exposing the stimulable phosphor sheet, from which the light shielding material has been removed, to stimulating rays which cause the stimulable phosphor sheet to emit light in proportion to the stored radiation energy, and photoelectrically detecting the emitted light.

19 Claims, 11 Drawing Sheets

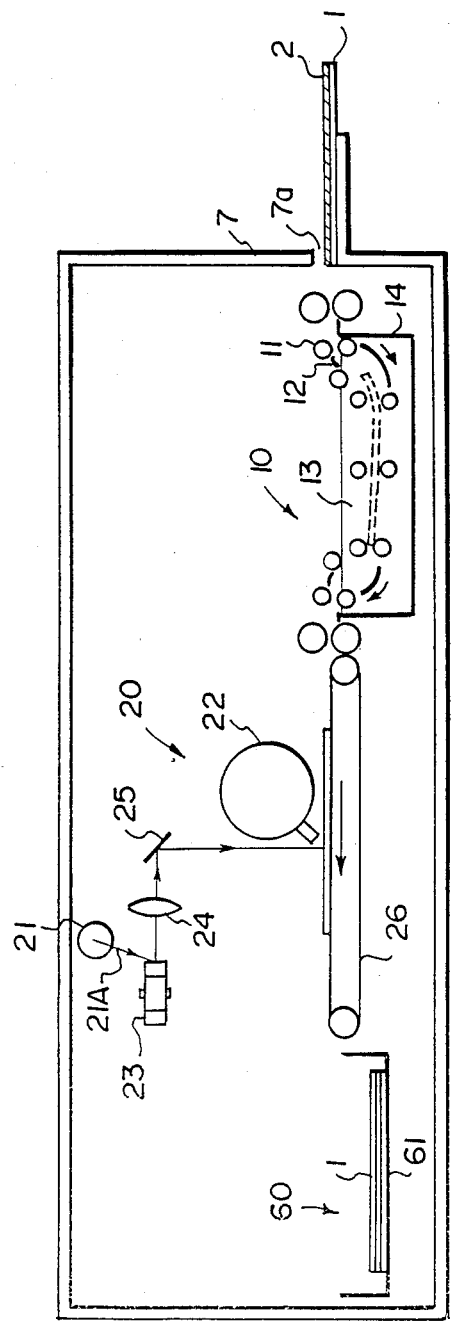
F I G. 1

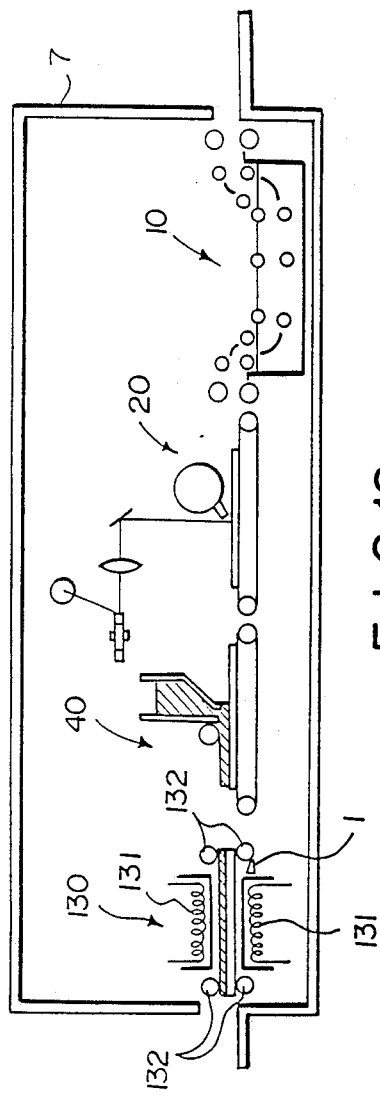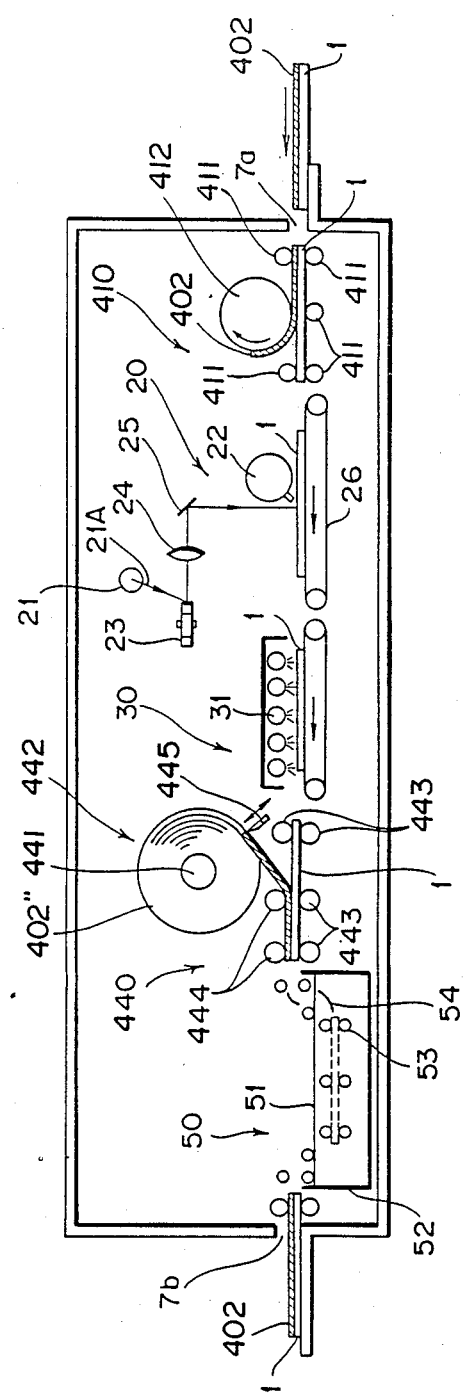

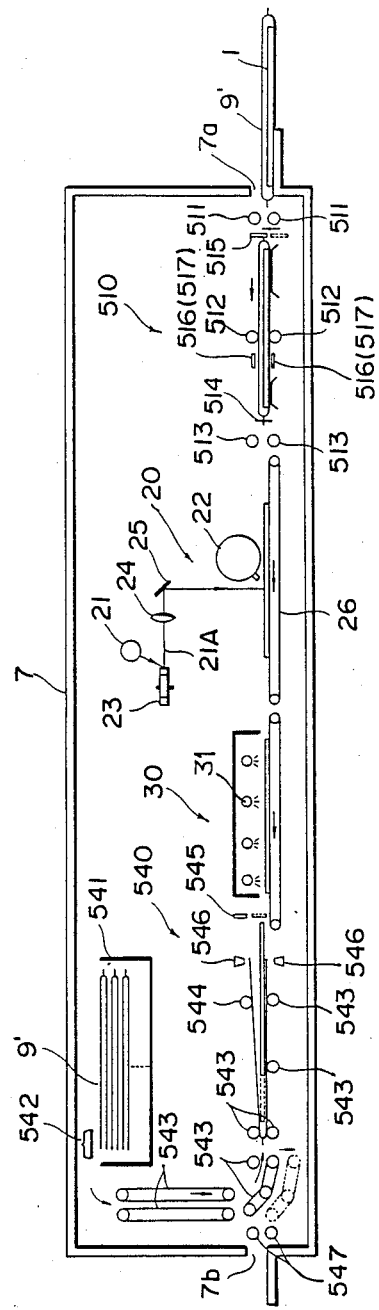

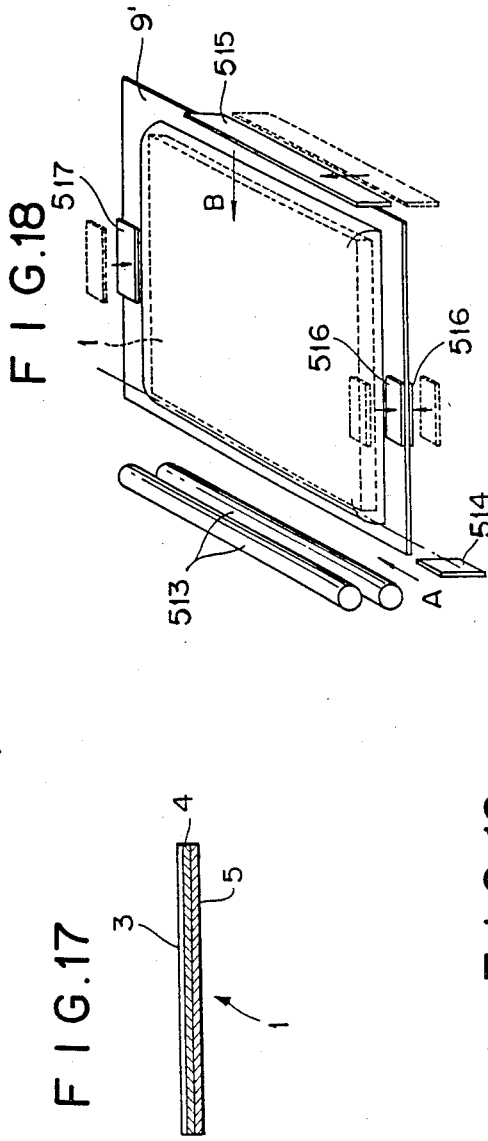
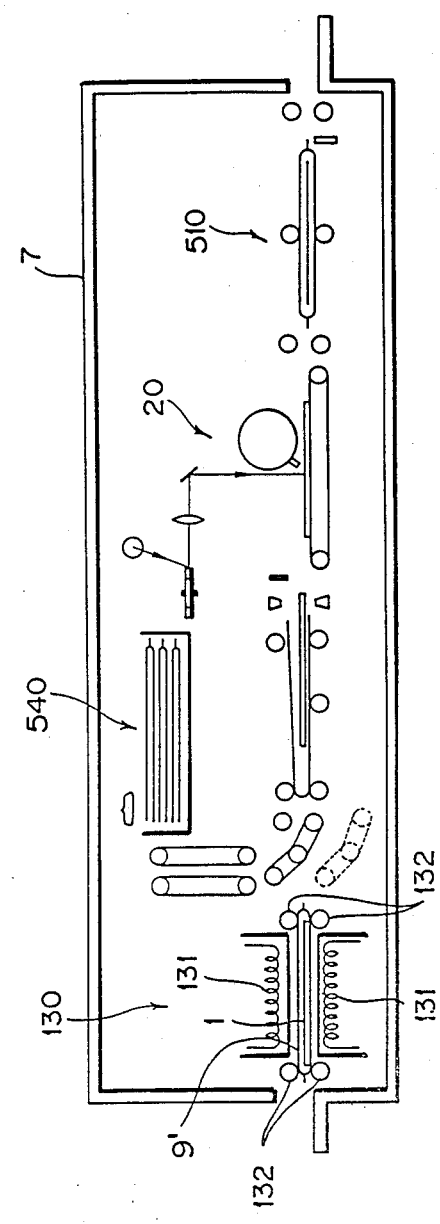

F I G. 20
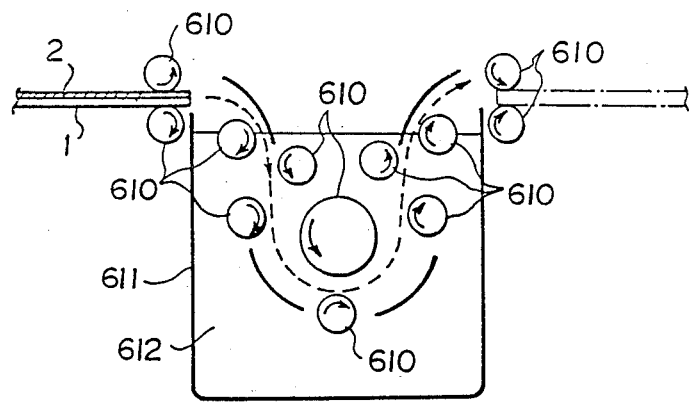
F I G. 21
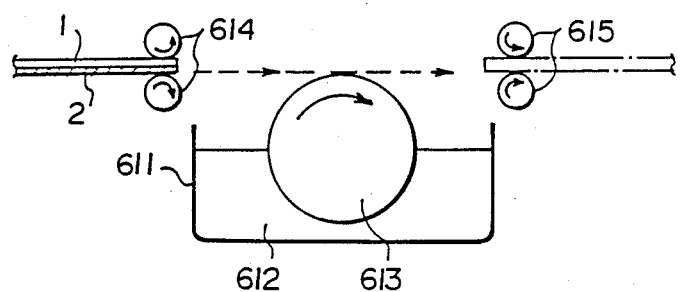
F I G. 22
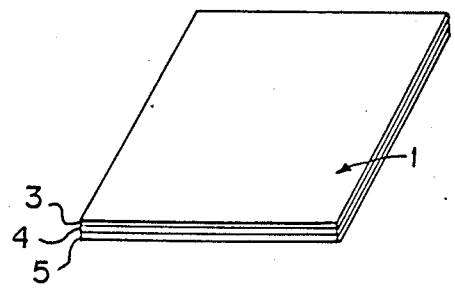
F I G. 23A
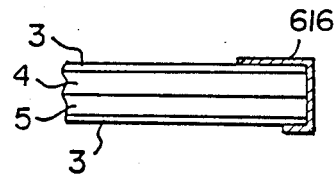
F I G. 23B
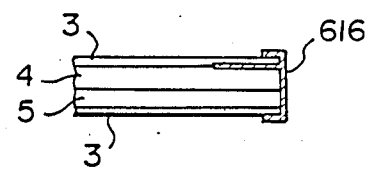

RADIATION IMAGE READ-OUT APPARATUS AND STIMULABLE PHOSPHOR SHEET COMPOSITE MEMBER FOR THE SAME

BACKGROUND OF THE INVENTION

1. Field of the Invention

This invention relates to a radiation image read-out apparatus for use in a radiation image recording and reproducing system. This invention particularly relates to a radiation image read-out apparatus suitable for image read-out from a stimulable phosphor sheet for dental image recording and for other purposes. This invention also relates to a stimulable phosphor sheet composite member comprising a stimulable phosphor sheet and a means for shielding the stimulable phosphor sheet from light, particularly a stimulable phosphor sheet composite member suitable for dental image recording and for other purposes.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

It has heretofore been known that the aforesaid radiation image recording and reproducing system using the stimulable phosphor sheet is utilized for diagnosis or viewing of a comparatively large object portion such as the head, the chest or the limb. It is also considered that the radiation image recording and reproducing system be utilized for dental image recording by use of a small stimulable phosphor sheet.

With the conventional radiation image recording and reproducing system, the stimulable phosphor sheet is generally subjected to image recording in the form housed in a cassette for housing a single stimulable phosphor sheet, and is then taken out of the cassette and processed for image read-out in a read-out apparatus. However, in the case of the dental image recording, it is not always possible to carry out the image recording by using of the aforesaid cassette, and it is necessary for the surface of the stimulable phosphor sheet to be provided with a light shielding means of a smaller scale than the cassette. Also, the stimulable phosphor sheet for use in the dental image recording must be markedly smaller than the stimulable phosphor sheet used in the aforesaid conventional image recording. Thus the stimulable phosphor sheet for the dental image recording is different in the light shielding means, the size and other factors from the conventional stimulable phosphor sheet, and therefore it is not always possible to carry out the image read-out from the stimulable phosphor sheet for the dental image recording by use of the conventional read-out apparatus.

SUMMARY OF THE INVENTION

The primary object of the present invention is to provide a radiation image read-out apparatus which enables read-out of an image stored on a stimulable phosphor sheet for dental image recording and the like.

Another object of the present invention is to provide a radiation image read-out apparatus which enables read-out of an image stored on a stimulable phosphor sheet for dental image recording and the like and which enables reuse of the stimulable phosphor sheet.

A further object of the present invention is to provide a stimulable phosphor sheet composite member comprising a stimulable phosphor sheet and a light shielding member and suitable for dental image recording, wherein provision and removal of the light shielding member on the stimulable phosphor sheet are easy and which is maintained in hygienic conditions during the image recording.

A still further object of the present invention is to provide a stimulable phosphor sheet composite member comprising a stimulable phosphor sheet and a lighttight envelope and suitable for dental image recording, wherein take-out of the stimulable phosphor sheet from the lighttight envelope is easy and which is maintained in hygienic conditions during the image recording.

The present invention provides a first radiation image read-out apparatus comprising:

(i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer, and (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light.

The present invention also provides a second radiation image read-out apparatus comprising:

(i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer, (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light, (iii) an erasing section for erasing the radiation energy remaining on said stimulable phosphor layer by irradiating light to said stimulable phosphor sheet after the image read-out has been finished and/or by heating said stimulable phosphor sheet, and (iv) a light shielding means forming section for forming a light shielding means at least on the surface of said stimulable phosphor sheet, for which the erasing has been finished, on the stimulable phosphor layer side.

The present invention further provides a third radiation image read-out apparatus comprising:

(i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer, (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light, (iii) a light shielding means forming section for forming a light shielding means at least on the surface of said stimulable phosphor sheet, for which the image read-out has been finished, on the stimulable phosphor layer side, and (iv) an erasing section for erasing the radiation energy remaining on said stimulable phosphor layer of said stimulable phosphor sheet, on which said light shielding means has been formed, by heating said stimulable phosphor sheet.

The present invention still further provides a fourth radiation image read-out apparatus comprising:

(i) a lighttight film removal section for peeling off and removing a lighttight film from a stimulable phosphor sheet comprising a stimulable phosphor layer and the lighttight film which is provided on a surface on the stimulable phosphor layer side, said stimulable phosphor sheet carrying a radiation image stored on said stimulable phosphor layer, (ii) a read-out section for reading out said radiation image by exposing said stimulable phosphor sheet, from which said lighttight film has been peeled off and removed, to stimulating rays which cause said stimulable phosphor sheet to emit light in proportion to the stored radiation energy, and photoelectrically detecting the emitted light, (iii) an erasing section for erasing the radiation energy remaining on said stimulable phosphor layer by irradiating light to said stimulable phosphor sheet after the image read-out has been finished and/or by heating said stimulable phosphor sheet, and (iv) a lighttight film forming section for providing a lighttight film on the surface of said stimulable phosphor sheet, for which the erasing has been finished, on the stimulable phosphor layer side.

The present invention also provides a fifth radiation image read-out apparatus comprising:

(i) a lighttight film removal section for peeling off and removing a lighttight film from a stimulable phosphor sheet comprising a stimulable phosphor layer and the lighttight film which is provided on a surface on the stimulable phosphor layer side, said stimulable phosphor sheet carrying a radiation image stored on said stimulable phosphor layer, (ii) a read-out section for reading out said radiation image by exposing said stimulable phosphor sheet, from which said lighttight film has been peeled off and removed, to stimulating rays which cause said stimulable phosphor sheet to emit light in proportion to the stored radiation energy, and photoelectrically detecting the emitted light, (iii) a lighttight film forming section for providing a lighttight film on the surface of said stimulable phosphor sheet, for which the image read-out has been finished, on the stimulable phosphor layer side, and (iv) an erasing section for erasing the radiation energy remaining on said stimulable phosphor layer of said stimulable phosphor sheet, on which said lighttight film has been provided, by heating said stimulable phosphor sheet.

The term "surface of a stimulable phosphor sheet on a stimulable phosphor layer side" as used herein for the first to fifth radiation image read-out apparatuses in accordance with the present invention means the surface at which irradiation of stimulating rays and detection of the light emitted by the stimulable phosphor sheet can be carried out for the stimulable phosphor layer, for example, the surface at which the stimulable phosphor layer is laid bare or the surface at which only a transparent layer is provided on the stimulable phosphor layer. Said surface may be a single surface of the stimulable phosphor sheet or both surfaces thereof.

In the first to third radiation image read-out apparatuses in accordance with the present invention, in order to remove the light shielding means by dissolution, the overall light shielding means need not necessarily be dissolved, and the overall light shielding means may be removed from the surface of the stimulable phosphor sheet by dissolving at least a part of the light shielding means. For example, a lighttight sheet may be adhered to the surface of the stimulable phosphor sheet on the stimulable phosphor layer side by an adhesive agent soluble in a solvent, and may be removed by dissolving the adhesive agent in a solvent.

Also, in the second to fifth radiation image read-out apparatuses in accordance with the present invention, the read-out section, the erasing section and other components need not necessarily be accommodated in the same case, and a part of these components may be provided independently insofar as the stimulable phosphor sheet can be transferred between the components.

The present invention further provides a sixth radiation image read-out apparatus comprising:

(i) a sheet take-out section for taking a stimulable phosphor sheet, which is accommodated in a lighttight envelope and carries a radiation image stored thereon, out of said envelope by opening said envelope, (ii) a read-out section for reading out said radiation image by exposing said stimulable phosphor sheet, which has been taken out of said envelope, to stimulating rays which cause said stimulable phosphor sheet to emit light in proportion to the stored radiation energy, and photoelectrically detecting the emitted light, (iii) an erasing section for erasing the radiation energy remaining on said stimulable phosphor sheet by irradiating light to said stimulable phosphor sheet after the image read-out has been finished and/or by heating said stimulable phosphor sheet, and (iv) a sheet loading section for loading said stimulable phosphor sheet, for which the erasing has been finished, into a lighttight envelope.

The present invention still further provides a seventh radiation image read-out apparatus comprising:

(i) a sheet take-out section for taking a stimulable phosphor sheet, which is accommodated in a lighttight envelope and carries a radiation image stored thereon, out of said envelope by opening said envelope, (ii) a read-out section for reading out said radiation image by exposing said stimulable phosphor sheet, which has been taken out of said envelope, to stimulating rays which cause said stimulable phosphor sheet to emit light in proportion to the stored radiation energy, and photoelectrically detecting the emitted light, (iii) a sheet loading section for loading said stimulable phosphor sheet, for which the image read-out has been finished, into a lighttight envelope, and (iv) an erasing section for erasing the radiation energy remaining on said stimulable phosphor sheet, which has been loaded into said envelope, by heating said stimulable phosphor sheet.

The term "taking out a stimulable phosphor sheet by opening an envelope" as used herein means that at least a part of the envelope is opened by, for example, cutting an edge of the envelope or peeling off two sheets constituting the envelope from each other, and the stimulable phosphor sheet is taken out of the envelope. Also, in the sixth and seventh radiation image read-out apparatuses in accordance with the present invention, the read-out section, the erasing section and other components need not necessarily be accommodated in the same case, and a part of these components may be provided independently insofar as the stimulable phosphor sheet can be transferred between the components.

The present invention also provides a first stimulable phosphor sheet composite member comprising:

(i) a stimulable phosphor sheet provided with a stimulable phosphor layer, and (ii) a lighttight layer overlaid on a surface of said stimulable phosphor sheet on the stimulable phosphor layer side by coating a lighttight material, which is composed of a binder soluble in a solvent and a lighttight substance dispersed in said binder, on said surface.

The present invention further provides a second stimulable phosphor sheet composite member comprising:

(i) a stimulable phosphor sheet provided with a stimulable phosphor layer, and (ii) a lighttight layer adhered to a surface of said stimulable phosphor sheet on the stimulable phosphor layer side by use of an adhesive agent soluble in a solvent.

In general, the stimulable phosphor sheet comprises a lighttight supporting material and a stimulable phosphor layer overlaid on the supporting material. In the first and second stimulable phosphor sheet composite members in accordance with the present invention, the lighttight layer may be directly coated on or adhered to the stimulable phosphor layer, or may be coated on or adhered to a transparent protective layer in the case where the transparent protective layer is provided on the stimulable phosphor layer.

The present invention still further provides a third stimulable phosphor sheet composite member comprising:

(i) a stimulable phosphor sheet provided with a stimulable phosphor layer, and (ii) a lighttight envelope soluble in a solvent and enclosing said stimulable phosphor sheet.

In the third stimulable phosphor sheet composite member in accordance with the present invention, the envelope may be of any type insofar as it is lighttight and soluble in a solvent. In general, the envelope may be formed of a sheet-shaped material composed of a material soluble in a solvent and a lighttight substance contained in the material.

With the first radiation image read-out apparatus in accordance with the present invention, the stimulable phosphor sheet for the dental image recording or the like provided with the light shielding means is processed at the light shielding means removal section for removing the light shielding means by dissolution and is then sent to the read-out section. Therefore, the image read-out from the stimulable phosphor sheet at the image read-out section can be carried out substantially.

Accordingly, with the first radiation image read-out apparatus in accordance with the present invention wherein the image read-out can be carried out for the stimulable phosphor sheet for the dental image recording or the like provided with the light shielding means on the stimulable phosphor layer, instead of being housed in a cassette for shielding from light, the application of the radiation image recording and reproducing system can be broadened markedly.

With the second and third radiation image read-out apparatuses in accordance with the present invention, the stimulable phosphor sheet for the dental image recording or the like provided with the light shielding means is processed at the light shielding means removal section for removing the light shielding means, and subjected to the image read-out and erasing. Also, a light shielding means is provided on the stimulable phosphor sheet at the light shielding means forming section. With the fourth and fifth radiation image read-out apparatuses in accordance with the present invention, the stimulable phosphor sheet provided with the lighttight film is processed at the lighttight film removal section for removing the lighttight film, and subjected to the image read-out and erasing. Also, a lighttight film is provided on the stimulable phosphor sheet at the lighttight film forming section. With the sixth and seventh radiation image read-out apparatuses in accordance with the present invention, the stimulable phosphor sheet for the dental image recording or the like provided with the light shielding means is taken out of the lighttight envelope at the sheet take-out section, and subjected to the image read-out and erasing. Also, the stimulable phosphor sheet is again loaded into a lighttight envelope at the sheet loading section. Accordingly, with the second to seventh radiation image read-out apparatuses in accordance with the present invention, the image read-out can be carried out substantially for the stimulable phosphor sheet for the dental image recording or the like, and the stimulable phosphor sheet can be taken out in the condition reusable for the image recording and can thus be reused efficiently.

As mentioned above, with the second to seventh radiation image read-out apparatuses in accordance with the present invention, the image read-out can be carried out for the stimulable phosphor sheet for the dental image recording or the like provided with the light shielding means or the lighttight film on the stimulable phosphor layer or accommodated in the lighttight envelope, instead of being housed in a cassette for shielding from light, and the stimulable phosphor sheet can be fed out in the form provided with a light shielding means or a lighttight film or accommodated in a lighttight envelope after the image read-out and erasing are finished. Therefore, the stimulable phosphor sheet can be used repeatedly, and the application of the radiation image recording and reproducing system can be broadened markedly.

With the first stimulable phosphor sheet composite member in accordance with the present invention wherein the lighttight layer is soluble in a solvent, the lighttight layer can be formed very simply by coating the lighttight material on the stimulable phosphor sheet, and can be removed simply by contacting the lighttight layer with a solvent. This method of removing the lighttight layer is advantageous particularly for the small stimulable phosphor sheet composite member for the dental image recording. Also, the lighttight layer can be dissolved and removed each time a single image recording step is finished, and a new lighttight layer can be provided on the stimulable phosphor sheet prior to the next image recording. Therefore, the first stimulable phosphor sheet composite member in accordance with the present invention is suitable for the dental image recording also from the viewpoint of hygiene.

With the second stimulable phosphor sheet composite member in accordance with the present invention wherein the lighttight layer is adhered to the stimulable phosphor sheet by use of an adhesive agent, the lighttight layer can be provided very simply, and can be removed simply by contacting the adhesive agent layer with a solvent. This method of removing the lighttight layer is advantageous particularly for the small stimulable phosphor sheet composite member for the dental image recording. Also, the lighttight layer can be peeled off by use of the solvent each time a single image recording step is finished, and a new lighttight layer can be adhered to the stimulable phosphor sheet prior to the next image recording. Therefore, the second stimulable phosphor sheet composite member in accordance with the present invention is suitable for the dental image recording also from the viewpoint of hygiene.

With the third stimulable phosphor sheet composite member in accordance with the present invention wherein the lighttight envelope is soluble in a solvent, the stimulable phosphor sheet can be taken out of the lighttight envelope simply by immersing the stimulable phosphor sheet together with the lighttight envelope in the solvent. This method of taking out the stimulable phosphor sheet is advantageous particularly for the small stimulable phosphor sheet composite member for the dental image recording. Also, the used lighttight envelope is removed by dissolution, and therefore no envelope disposal operation is required after the take-out of the stimulable phosphor sheet. Moreover, the lighttight envelope can be removed by dissolution each time a single image recording step is finished, and the stimulable phosphor sheet can then be accommodated in a new lighttight envelope prior to the next image recording. Therefore, the third stimulable phosphor sheet composite member in accordance with the present invention is suitable for the dental image recording also from the viewpoint of hygiene.

BRIEF DESCRIPTION OF THE DRAWINGS

FIG. 1 is a schematic side view showing an embodiment of the first radiation image read-out apparatus in accordance with the present invention, FIG. 11 is a schematic side view showing an embodiment of the third radiation image read-out apparatus in accordance with the present invention, FIG. 12 is a schematic side view showing an embodiment of the fourth radiation image read-out apparatus in accordance with the present invention, FIG. 16 is a schematic side view showing an embodiment of the sixth radiation image read-out apparatus in accordance with the present invention, FIG. 17 is a sectional view showing the stimulable phosphor sheet utilized in the embodiment shown in FIG. 16, FIG. 18 is a perspective view showing the major part of the sheet take-out section in the embodiment shown in FIG. 16, FIG. 19 is a schematic side view showing an embodiment of the seventh radiation image read-out apparatus in accordance with the present invention, FIGS. 20 and 21 are schematic views showing the removal means for removing the lighttight layer from an embodiment of the first stimulable phosphor sheet composite member in accordance with the present invention, FIG. 22 is a perspective view showing the stimulable phosphor sheet with the lighttight layer removed therefrom, and FIGS. 23A and 23B are schematic views showing edge portions of the stimulable phosphor sheets in further embodiments of the first stimulable phosphor sheet composite member in accordance with the present invention.

DESCRIPTION OF THE PREFERRED EMBODIMENTS

The present invention will hereinbelow be described in further detail with reference to the accompanying drawings.

Figure 2:
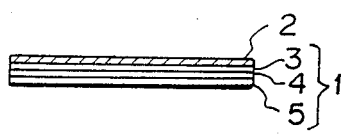
FIGS. 2 and 3 are sectional views showing stimulable phosphor sheets provided with a light shielding means and utilized in the embodiment shown in FIG. 1.

With reference to FIG. 1, an embodiment of the first radiation image read-out apparatus in accordance with the present invention comprises a light shielding means removal section 10 and a read-out section 20 housed in a case 7. As shown in FIG. 2, a stimulable phosphor sheet 1 from which an image is to be read out comprises a supporting layer 5, a stimulable phosphor layer 4 overlaid on the supporting layer 5, and a transparent protective layer 3 overlaid on the stimulable phosphor layer 4. A lighttight film 2 as a light shielding means is overlaid on the protective layer 3 of the stimulable phosphor sheet 1. The lighttight film 2 is permeable to radiation such as X-rays, and is formed by coating a lighttight material comprising, for example, an alcohol-soluble binder such as polyvinyl acetate (PVAC) or polyvinyl butyral (PVB), and carbon black as a lighttight substance dispersed in the binder. Also, the stimulable phosphor sheet 1 is of the type used for dental image recording, and has a small size of 3 cm×4 cm.

After the dental image recording is carried out on the stimulable phosphor sheet 1 in the form provided with the lighttight film 2 on the surface in an external image recording apparatus (not shown), the stimulable phosphor sheet 1 is fed to the radiation image read-out apparatus through an inlet 7a of the case 7, and conveyed to the light shielding means removal section 10.

At the light shielding means removal section 10, the stimulable phosphor sheet 1 is passed through a solvent vessel 14 filled with an alcohol 13 in the direction as indicated by the arrow by being guided by a plurality of rollers 11, 11, . . . and guide plates 12, 12, . . . , and the lighttight film 2 is dissolved in the alcohol 13 and is thus removed from the stimulable phosphor sheet 1. The stimulable phosphor sheet 1 is small, and therefore removal of the lighttight film 2 can be achieved very easily. The solvent used in this embodiment must be selected from those capable of substantially dissolving the binder of the lighttight film 2 and having no adverse effects on the stimulable phosphor sheet 1. For example, methyl ethyl ketone, toluene, a toluene-alcohol mixture solvent, or water may be used as such a solvent as well as the aforesaid alcohol. An acrylic resin, polyurethane, unsaturated polyester, an epoxy resin, a cellulose derivative or the like may be used as the binder soluble in methyl ethyl ketone or toluene. Polyurethane or the like may be used as the binder soluble in the toluene-alcohol mixture solvent. Polyvinyl alcohol (PVA), polyethylene oxide, a cellulose derivative, starch, gelatin or the like may be used as the binder soluble in water. In the case where the stimulable phosphor sheet is of the type used for the dental image recording as in this embodiment, the stimulable phosphor sheet is inserted into the mouth for carrying out the image recording, and therefore a binder soluble in water is not suitable. However, the stimulable phosphor sheet utilized in accordance with the present invention is not limited to the type for the dental image recording, and may be of the type used for the image recording other than the dental image recording, wherein the stimulable phosphor sheet subjected to the image recording should not be in the form housed in a cassette. In this case, the water-soluble binder may be utilized.

After the lighttight film 2 is removed by dissolution from the stimulable phosphor sheet 1 at the light shielding means removal section 10, the stimulable phosphor sheet 1 is conveyed to the read-out section 20 for reading out the radiation image stored on the stimulable phosphor layer 4.

At the read-out section 20, the stimulable phosphor sheet 1 carrying the radiation image stored thereon is scanned by stimulating rays 21A such as a laser beam which are produced by a laser beam source 21 and reflected and deflected by a rotating polygon mirror 23 and which cause the stimulable phosphor sheet 1 to emit light in proportion to the stored radiation energy, and the emitted light is photoelectrically detected by a photomultiplier 22 as a photoelectric read-out means to obtain electric image signals for use in reproduction of a visible image. In FIG. 1, reference numeral 24 denotes a scanning lens such as an $f\theta$ lens, and reference numeral 25 denotes a reflection mirror. The photomultiplier 22 is a cylindrical side-on type photomultiplier for receiving light at a side face thereof. The stimulable phosphor sheet 1 is small as mentioned above, and therefore the light receiving face of the photomultiplier 22 can directly cover the overall scanning position of the stimulating rays 21A even though no light guide member is provided on the light receiving face. The stimulable phosphor sheet 1 is conveyed in a subscanning direction by an endless belt 26 provided at the read-out section 20 and, at the same time, the stimulating rays 21A repeatedly scan the stimulable phosphor sheet 1 in a main scanning direction. In this manner, the stimulable phosphor sheet 1 is two-dimensionally scanned by the stimulating rays 21A, and the light carrying the radiation image is emitted by the scanned portion of the stimulable phosphor sheet 1. The emitted light impinges upon the photomultiplier 22 which photoelectrically detects the emitted light and generates the image signals.

After the radiation image is read from the stimulable phosphor sheet 1 at the read-out section 20, the stimulable phosphor sheet 1 is conveyed to a tray holding section 60 adjacent to the read-out section 20. The tray holding section 60 releasably holds a tray 61 capable of housing therein a plurality of stimulable phosphor sheets 1, 1, . . . The stimulable phosphor sheets 1, 1, . . . for which the image read-out has been finished in the manner as mentioned above are sequentially conveyed into the tray 61. At the time a predetermined number of the stimulable phosphor sheets 1, 1, . . . have been conveyed into the tray 61, the tray 61 is taken out of the case 7 and sent to, for example, an external erasing apparatus for erasing the radiation energy remaining on the stimulable phosphor sheet 1.

With this embodiment wherein the light shielding means removal section 10 is provided as well as the read-out section 20 and the lighttight film 2 provided on the stimulable phosphor sheet 1 is removed by dissolution prior to the image read-out, the image read-out can be carried out substantially for the stimulable phosphor sheet 1 for the dental image recording provided with the lighttight film 2, instead of being housed in a cassette.

A stacker capable of housing therein a plurality of the stimulable phosphor sheets 1, 1, . . . and feeding out the housed stimulable phosphor sheets 1, 1, . . . one by one may be provided between the light shielding means removal section 10 and the read-out section 20. In this case, removal of the light shielding means from the stimulable phosphor sheets 1, 1, . . . can be carried out sequentially without waiting until the image read-out from a preceding stimulable phosphor sheet 1 is finished at the read-out section 20.

Figure 3:

The light shielding means provided on the surface of the stimulable phosphor sheet 1 is not limited to the lighttight film 2 formed by coating the aforesaid lighttight material on the stimulable phosphor sheet 1. For example, as shown in FIG. 3, a lighttight sheet 6 containing carbon black or the like may be adhered to the surface of the stimulable phosphor sheet 1 by use of an adhesive agent 8 soluble in a solvent. The adhesive agent 8 is formed of polyvinyl acetate (PVAC), polyvinyl butyral (PVB) or the like, which is soluble in an alcohol. At the light shielding means removal section 10 shown in FIG. 1, the stimulable phosphor sheet 1 provided with the lighttight sheet 6 is passed through the vessel 14 filled with the alcohol. As a result, the adhesive agent 8 contacts the alcohol and is dissolved therein, and the lighttight sheet 6 is thus removed from the stimulable phosphor sheet 1.

Figure 4:
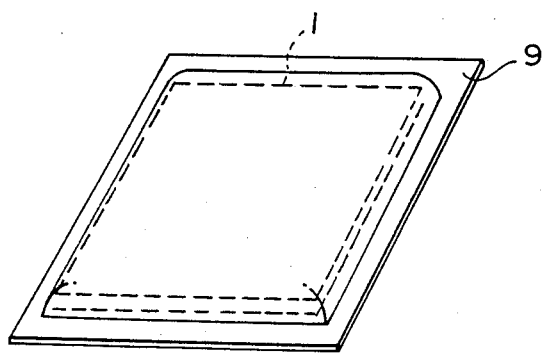
FIG. 4 is a perspective view showing the lighttight envelope accommodating the stimulable phosphor sheet and utilized in the embodiment shown in FIG. 1, FIGS. 5, 6 and 7 are perspective views showing examples of the read-out sections utilized in the radiation image read-out apparatuses in accordance with the present invention.

Also, as shown in FIG. 4, the light shielding means for the stimulable phosphor sheet 1 may be a lighttight envelope 9 which is soluble in a solvent and encloses the overall stimulable phosphor sheet 1. By way of example, the lighttight envelope 9 is formed of a sheet comprising polyvinyl acetate (PVAC) or polyvinyl butyral (PVB), which is soluble in an alcohol, and carbon black contained therein. Also, in this case, the stimulable phosphor sheet 1 accommodated in the lighttight envelope 9 is passed through the vessel 14 filled with the alcohol at the light shielding means removal section 10 shown in FIG. 1. In this manner, the lighttight envelope 9 can be removed by dissolution, and the stimulable phosphor sheet 1 can thus be taken out of the lighttight envelope 9.

In the radiation image read-out apparatus of the present invention, the small stimulable phosphor sheet 1 for the dental image recording is utilized substantially as the stimulable phosphor sheet, and therefore the read-out section can be fabricated compact by the utilization of the small size of the stimulable phosphor sheet 1. Modifications of the read-out section will hereinbelow be described with reference to FIGS. 5, 6 and 7.

Figure 5:
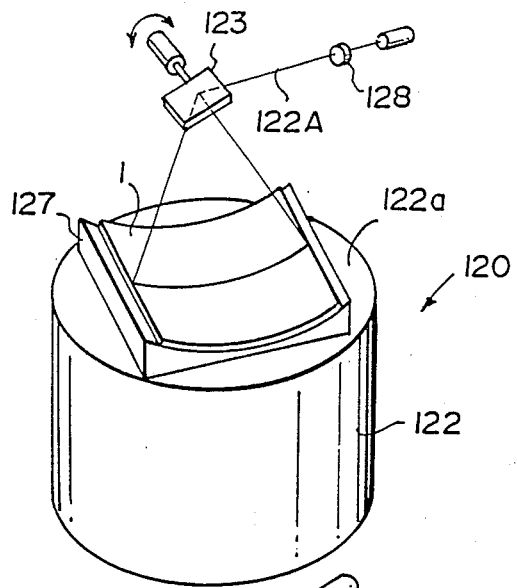

With reference to FIG. 5, a read-out section 120 comprises a head-on type photomultiplier 122 having a light receiving face 122a, and a transparent supporting base 127 provided on the light receiving face 122a for supporting the stimulable phosphor sheet 1 on a cylindrical surface. In the case where the stimulable phosphor sheet 1 is supported in the cylindrical surface form by the supporting base 127, only a light deflector such as a galvanometer mirror (and a converging lens 128 when necessary) may be provided in the optical path of stimulating rays 122A, and no fθ lens need be provided. Therefore, the optical system can be simplified. Also, the stimulable phosphor sheet 1 is supported substantially directly on the photomultiplier 122, the read-out section 120 can be made markedly small. At the read-out section 120 shown, scanning in the sub-scanning direction may be carried out by moving the stimulable phosphor sheet 1, or by moving the overall main scanning system in the sub-scanning direction with the stimulable phosphor sheet 1 standing stationary. Also, the supporting base 127 may be constituted to act in the same manner as a light guide means and guides the light emitted by the stimulable phosphor sheet 1 to the photomultiplier 122. In this modification wherein the light emitted by the stimulable phosphor sheet 1 is detected from the surface opposite to the surface on the stimulating ray irradiation side, the aforesaid supporting layer 5 of the stimulable phosphor sheet 1 must be transparent. This also applies to the modifications shown in FIGS. 6 and 7. Therefore, it is necessary for the light shielding means to be provided on both surfaces of the stimulable phosphor sheet 1, and the aforesaid light shielding means removal section 10 dissolves the light shielding means on both surfaces of the stimulable phosphor sheet 1.

Figure 6:
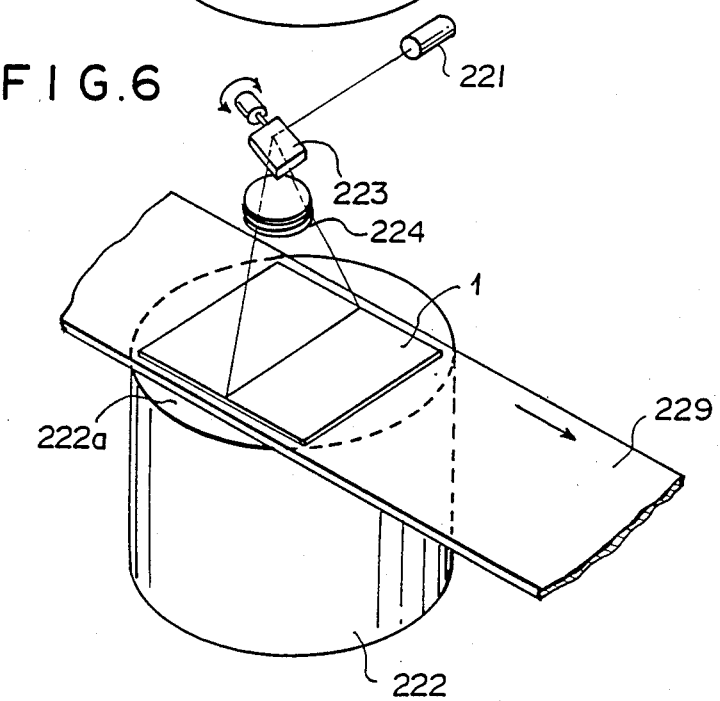

With reference to FIG. 6, a read-out section 220 comprises a photomultiplier 222 having a light receiving face 22a, and a transparent stimulable phosphor sheet carrier 229 provided on the light receiving face 222a for supporting the stimulable phosphor sheet 1 and moving it in the sub-scanning direction as indicated by the arrow. The stimulable phosphor sheet 1 is scanned in the main scanning direction by a main scanning means comprising a stimulating rays source 221, a light deflector 223 constituted by a galvanometer mirror or the like, and a scanning lens 224 constituted by an fθ lens or the like, and is scanned in the sub-scanning direction by the stimulable phosphor sheet carrier 229. In this manner, the stimulable phosphor sheet 1 is two-dimensionally scanned by stimulating rays 221A.

Figure 7:
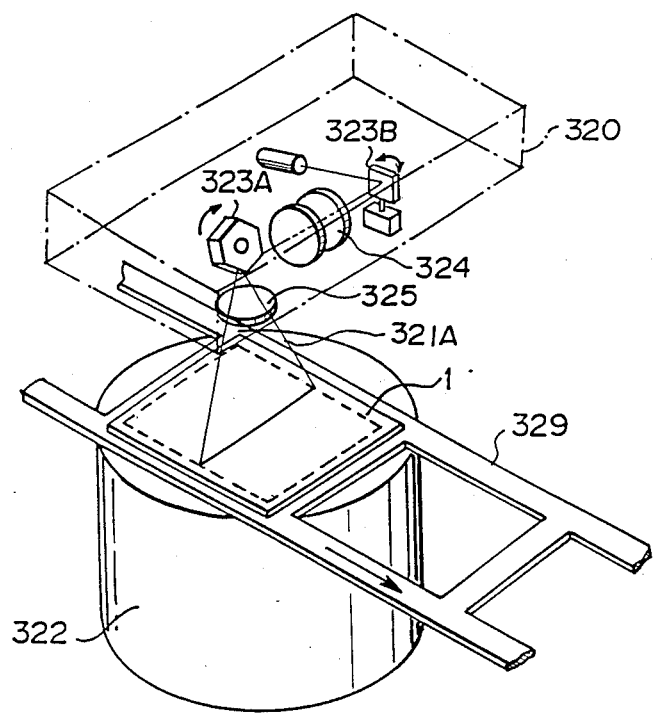

With reference to FIG. 7, a read-out section 320 is provided with a light deflector 323A for the main scanning, a light deflector 323B for the sub-scanning, a lens 324 for guiding stimulating rays 321A, which have been deflected by the light deflector 323B for the sub-scanning in the sub-scanning direction, to the light deflector 323A for the main scanning, and a scanning lens 325 constituted by an fθ lens or the like. The stimulating rays 321A are two-dimensionally scanned on the stimulable phosphor sheet 1 standing stationary. The stimulable phosphor sheet 1 is supported on a carrier 329 comprising frames each for supporting a single stimulable phosphor sheet 1 and continuing to one another. At the time the image read-out from a single stimulable phosphor sheet 1 is finished, the carrier 329 is moved in the direction as indicated by the arrow until the next stimulable phosphor sheet 1 is located at the stimulating ray scanning position on a photomultiplier 322.

Figure 8:
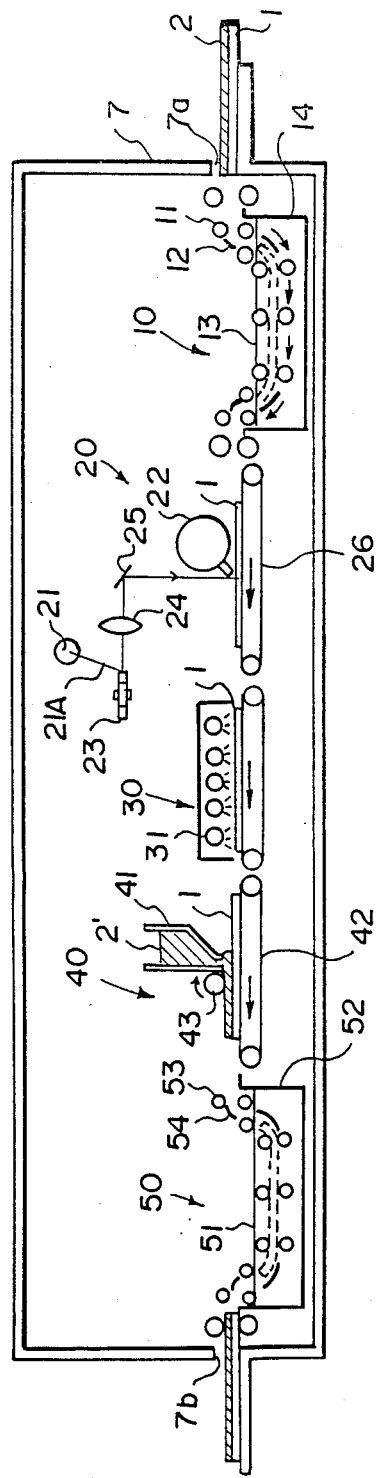
FIG. 8 is a schematic side view showing an embodiment of the second radiation image read-out apparatus in accordance with the present invention.

An embodiment of the second radiation image read-out apparatus in accordance with the present invention will hereinbelow be described with reference to FIGS. 8, 9 and 10. In FIG. 8, similar elements are numbered with the same reference numerals with respect to FIG. 1.

With reference to FIG. 8, the embodiment of the second radiation image read-out apparatus in accordance with the present invention is provided with the light shielding means removal section 10, the read-out section 20, an erasing section 30, and a light shielding means forming section 40. The lighttight film 2 is removed by dissolution from the stimulable phosphor sheet 1 at the light shielding means removal section 10, and the radiation image stored on the stimulable phosphor sheet 1 is read out at the read-out section 20 in the same manner as in the embodiment shown in FIG. 1. The stimulable phosphor sheet 1 then is sent to the erasing section 30 adjacent to the read-out section 20, and the radiation energy remaining on the stimulable phosphor sheet 1 after the image read-out has been carried out is erased. At the erasing section 30, any erasing method may be used. In this embodiment, the stimulable phosphor sheet 1 is passed below erasing light sources 31, 31, . . . constituted by fluorescent lamps, tungsten-filament lamps, sodium lamps, xenon lamps, iodine lamps or the like, and the stimulable phosphor sheet 1 is exposed to erasing light produced by the erasing light sources 31, 31, . . . for releasing the residual radiation energy from the stimulable phosphor layer of the stimulable phosphor sheet 1. The erasing may also be carried out by heating the stimulable phosphor sheet 1 as will be described later as well as by the irradiation of the erasing light. Therefore, the erasing light sources 31, 31, . . . may be replaced by a heating means, or both the erasing light sources 31, 31, . . . and the heating means may be provided.

Before the stimulable phosphor sheet 1 for which the erasing has been carried out is reused for the image recording, a lighttight film 2 is provided on the surface of the stimulable phosphor sheet 1 at the light shielding means forming section 40. Specifically, the light shielding means forming section 40 is provided with a coating composition feed means 41 which contains a coating composition 2' composed of PVA or PVB and carbon black dispersed therein and which allows the coating composition 2' to flow out little by little from a lower part, and a roll coater 43 rotated in the direction as indicated by the arrow in contact with the stimulable phosphor sheet 1 conveyed by an endless belt 42, thereby to uniformly extend the coating composition 2' flowing out of the coating composition feed means 41 on the surface of the stimulable phosphor sheet 1. As the stimulable phosphor sheet 1 passes below the light shielding means forming section 40, a lighttight film 2 is overlaid on the overall surface of the stimulable phosphor sheet 1. The roll coater 43 may be replaced by any other known coating means such as a knife coater or a doctor blade.

The stimulable phosphor sheet 1 on which the lighttight film 2 is provided in the manner as mentioned above is sent to a washing and sterilizing section 50. At the washing and sterilizing section 50, the stimulable phosphor sheet 1 is passed through a vessel 52 containing an alcohol 51 by being guided by rollers 53, 53, . . . and guide plates 54, 54, . . . , and the surfaces of the stimulable phosphor sheet 1 are washed and sterilized. The stimulable phosphor sheet 1 is then taken out of an outlet 7b of the case 7 and used for the image recording.

With this embodiment of the second radiation image read-out apparatus in accordance with the present invention wherein the light shielding means removal section 10 and the light shielding means forming section 40 are provided as well as the read-out section 20 and the erasing section 30, the image read-out can be carried out substantially for the stimulable phosphor sheet 1 for the dental image recording or the like provided with the lighttight film 2, instead of being housed in a cassette, and the stimulable phosphor sheet 1 can be reused efficiently. The components of this embodiment need not necessarily be housed in the same case, and a part of the components may be provided independently such that, for example, the light shielding means removal section 10 and the read-out section 20 are combined together, and the erasing section 30, the light shielding means forming section 40 and the washing and sterilizing section 50 are combined together. Also, a stacker capable of housing therein a plurality of the stimulable phosphor sheets 1, 1, . . . and feeding out the housed stimulable phosphor sheets 1, 1, . . . one by one may be provided between the light shielding means removal section 10 and the read-out section 20. In this case, removal of the lighttight films 2, 2, . . . by dissolution from the stimulable phosphor sheets 1, 1, . . . can be carried out sequentially without waiting until the image read-out from a preceding stimulable phosphor sheet 1 is finished at the read-out section 20. The stacker may also be provided between the erasing section 30 and the light shielding means forming section 40. Though the washing and sterilizing section 50 need not necessarily be provided, they should preferably be provided.

Figure 9:
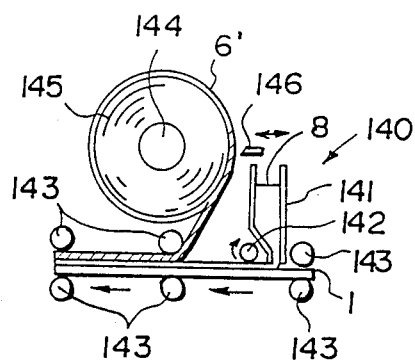
FIGS. 9 and 10 are side views showing examples of the light shielding means forming sections utilized in the second radiation image read-out apparatus in accordance with the present invention.
Figure 10:
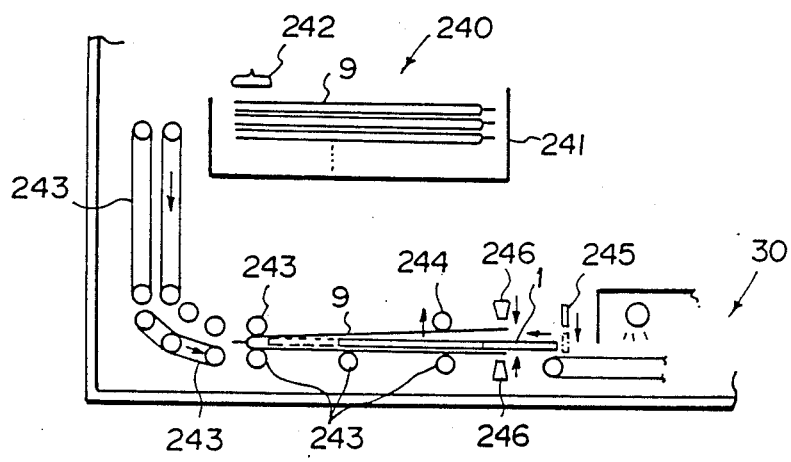

In the case where the lighttight sheet 6 containing carbon black or the like and adhered to the surface of the stimulable phosphor sheet 1 by use of the adhesive agent 8 soluble in a solvent as shown in FIG. 3 is utilized as the light shielding means provided on the surface of the stimulable phosphor sheet 1, the lighttight sheet 6 may be provided on the stimulable phosphor sheet 1 by use of a light shielding means forming section 140 as shown in FIG. 9.

With reference to FIG. 9, the light shielding means forming section 140 is provided with an adhesive agent feed means 141 for feeding the adhesive agent 8 onto the stimulable phosphor sheet 1 conveyed by conveying rollers 143, 143, . . . in the direction as indicated by the arrow, and a roller 142 for extending the adhesive agent 8 fed from the adhesive agent feed means 141 over the overall surface of the stimulable phosphor sheet 1. The adhesive agent 8 is coated on the overall surface of the stimulable phosphor sheet 1 by the adhesive agent feed means 141 and the roller 142. The light shielding means forming section 140 is also provided with a lighttight sheet feed means 145 comprising a roller 144 and a belt-shaped lighttight sheet material 6' wound around the roller 144. The lighttight sheet feed means 145 first feeds out the lighttight sheet material 6' so that the leading edge of the lighttight sheet material 6' coincides with the leading edge of the stimulable phosphor sheet 1 conveyed by the conveying rollers 143, 143, . . . , and then rotates the roller 144 at a speed equal to the conveyance speed of the stimulable phosphor sheet 1. The lighttight sheet feed means 145 is also provided with a cutter 146 moveable in the direction as indicated by the arrow. At the time the lighttight sheet material 6' has been fed out by a distance equal to the length of the stimulable phosphor sheet 1, the cutter 146 cuts the lighttight sheet material 6'. In this manner, the lighttight sheet 6 is provided on the stimulable phosphor sheet 1 via the adhesive agent 8, and the stimulable phosphor sheet 1 and the lighttight sheet 6 are secured to each other as they are grasped and conveyed by the conveying rollers 143, 143, . . .

Also, the lighttight envelope 9 soluble in a solvent and enclosing the overall stimulable phosphor sheet 1 as shown in FIG. 4 may be utilized as the light shielding means for the stimulable phosphor sheet 1. In this case, in order to again accommodate the stimulable phosphor sheet 1, for which the erasing has been finished, in a new lighttight envelope 9, a light shielding means forming section 240 as shown in FIG. 10 may be utilized. Specifically, with reference to FIG. 10, the light shielding means forming section 240 is provided with an envelope housing means 241 which houses therein a plurality of empty lighttight envelopes 9, 9, . . . The lighttight envelopes 9, 9, . . . are taken one by one out of the envelope housing means 241 by a suction cup 242. The lighttight envelope 9 thus taken out is conveyed by a conveyance means 243 comprising endless belts and rollers to a stimulable phosphor sheet inserting position. A suction roller 244 contacting the edge portion of the lighttight envelope 9 located at the sheet inserting position starts suction and is moved up to broaden the opening of the lighttight envelope 9 at the time the lighttight envelope 9 is stopped at the predetermined position. The stimulable phosphor sheet 1 for which the erasing has been finished is then conveyed leftward into the lighttight envelope 9, and stopped at the position indicated by the solid line. A push member 245 is then moved from the position indicated by the solid line to the position indicated by the chain line, and is then moved leftward to push the stimulable phosphor sheet 1 leftward to the position indicated by the broken line. After the stimulable phosphor sheet 1 has been completely conveyed into the lighttight envelope 9, pressure means 246, 246 for heat sealing grasp the edge of the lighttight envelope 9 from above and below and seals the opening of the lighttight envelope 9. The lighttight envelope 9 enclosing the stimulable phosphor sheet 1 may be taken horizontally out of the apparatus, or may be conveyed by the conveyance means 243 reversely to the direction of the aforesaid conveyance to, for example, the washing and sterilizing section 50.

In the case where the read-out section 120 shown in FIG. 5, the read-out section 220 shown in FIG. 6, or the read-out section 320 shown in FIG. 7 is utilized, the aforesaid supporting layer 5 of the stimulable phosphor sheet 1 must be transparent, and it is necessary for the light shielding means to be provided on both surfaces of the stimulable phosphor sheet 1. Therefore, the light shielding means removal section 10 and the light shielding means forming section 40 respectively dissolve and provide the light shielding means on both surfaces of the stimulable phosphor sheet 1.

In the embodiment of the second radiation image read-out apparatus in accordance with the present invention shown in FIG. 8, the new light shielding means is provided on the stimulable phosphor sheet 1 after the erasing is carried out. However, as shown in FIG. 11, the light shielding means may be provided immediately after the image read-out is finished, and then the erasing may be carried out. In FIG. 11 showing an embodiment of the third radiation image read-out apparatus in accordance with the present invention, the light shielding means removal section 10 and the read-out section 20 are the same as those in the embodiment shown in FIG. 8. Also, the light shielding means forming section 40 is the same as in the embodiment shown in FIG. 8 except for the position thereof.

With reference to FIG. 11, after the lighttight film 2 is removed by dissolution from the stimulable phosphor sheet 1 at the light shielding means removal section 10 and the image read-out from the stimulable phosphor sheet 1 is finished at the read-out section 20, the stimulable phosphor sheet 1 is sent to the light shielding means forming section 40, and a new lighttight film 2 is coated on the surface of the stimulable phosphor sheet 1. The stimulable phosphor sheet 1 provided with the lighttight film 2 is then conveyed to an erasing section 130.

The erasing section 130 is provided with nip rollers 132, 132, . . . for grasping both edge portions of the stimulable phosphor sheet 1, and heaters 131, 131 facing the stimulable phosphor sheet 1, which is grasped by the nip rollers 132, 132, . . . , from above and below. The stimulable phosphor sheet 1 is disposed between the heaters 131, 131 as shown by being grasped by the nip rollers 132, 132, . . . , and is heated by the heaters 131, 131 to release the radiation energy remaining on the stimulable phosphor layer.

In the case where the erasing is carried out after the provision of the lighttight film 2, the erasing by the erasing light cannot be carried out, and therefore the erasing by heat is employed. The erasing by heat also effects sterilization of the stimulable phosphor sheet 1, and therefore an independent sterilizing means is not required. Therefore, after being cooled, the stimulable phosphor sheet 1 can be immediately used for the image recording.

An embodiment of the fourth radiation image read-out apparatus in accordance with the present invention will hereinbelow be described with reference to FIG. 12. In FIG. 12, similar elements are numbered with the same reference numerals with respect to FIGS. 1 and 8.

Figure 13:
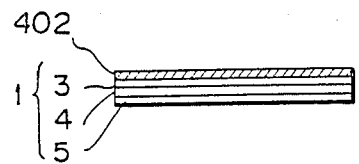
FIG. 13 is a sectional view of the stimulable phosphor sheet utilized in the embodiment shown in FIG. 12, FIGS. 14A and 14B are schematic views showing examples of the means for peeling off the lighttight film from the stimulable phosphor sheet in the embodiment shown in FIG. 12.

With reference to FIG. 12, the embodiment comprises a lighttight film removal section 410, the read-out section 20, the erasing section 30, and a lighttight film forming section 440, which are housed in the case 7. As shown in FIG. 13, the stimulable phosphor sheet 1 from which an image is to be read out comprises the supporting layer 5, the stimulable phosphor layer 4 overlaid on the supporting layer 5, and the transparent protective layer 3 overlaid on the stimulable phosphor layer 4. A lighttight film 402 is overlaid on the protective layer 3 of the stimulable phosphor sheet 1. The lighttight film 402 is permeable to radiation such as X-rays, and is constituted by a film comprising, for example, a binder such as nitrocellulose, ethyl cellulose, polyvinyl chloride or polyurethane, and carbon black as a lighttight substance dispersed in the binder. Also, the stimulable phosphor sheet 1 is of the type used for dental image recording, and has a small size of 3 cm×4 cm.

Figure 14A:
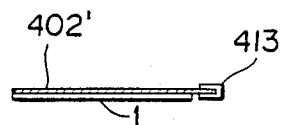
Figure 14B:
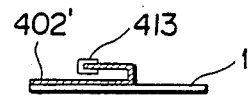

After the dental image recording is carried out on the stimulable phosphor sheet 1 in the form provided with the lighttight film 402 on the surface in an external image recording apparatus (not shown), the stimulable phosphor sheet 1 is fed to the radiation image read-out apparatus through an inlet 7a of the case 7, and conveyed to the lighttight film removal section 410. At the lighttight film removal section 410, an adhesive roller 412 is contacted with the surface on the lighttight film side of the stimulable phosphor sheet 1 conveyed by conveying rollers 411, 411, . . . in the direction as indicated by the arrow. The adhesive roller 412 is rotated to adhere the lighttight film 402 to the circumferential surface of the adhesive roller 412 and peel off the lighttight film 402 from the stimulable phosphor sheet 1. In order to facilitate the peeling of the lighttight film 402, a release agent may be applied in advance to the surface of the protective layer 3 or to the inner surface of the lighttight film 402. The means for peeling off the lighttight film 402 is not limited to the adhesive roller 412, and the adhesive roller 412 may be replaced by a suction roller for sucking and peeling off the lighttight film 402. Alternatively, as shown in FIG. 14A, a lighttight film 402' may be extended slightly longer than the stimulable phosphor sheet 1, and may be grasped by a grasping means 413. Then, as shown in FIG. 14B, the grasping means 413 may be moved to peel off the lighttight film 402'.

The stimulable phosphor sheet 1 from which the lighttight film 402 has been peeled off at the lighttight film removal section 410 is conveyed to the read-out section 20 and the erasing section 30.

Before the stimulable phosphor sheet 1 for which the image read-out and the erasing have been carried out is reused for the image recording, a lighttight film 402 is provided on the surface of the stimulable phosphor sheet 1 at the lighttight film forming section 440. Specifically, the lighttight film forming section 440 is provided with provided with a lighttight film feed means 442 comprising a roller 441 and a belt-shaped lighttight film material 402" wound around the roller 441. The lighttight film feed means 442 first feeds out the lighttight film material 402" so that the leading edge of the lighttight film material 402″ coincides with the leading edge of the stimulable phosphor sheet 1 conveyed by the conveying rollers 443, 443, . . . , and then rotates the roller 441 at a speed equal to the conveyance speed of the stimulable phosphor sheet 1. The lighttight film feed means 442 is also provided with a cutter 445 moveable in the direction as indicated by the arrow. At the time the lighttight film material 402″ has been fed out by a distance equal to the length of the stimulable phosphor sheet 1, the cutter 445 cuts the lighttight film material 402″. Heating rollers 444, 444 provided in front of the position of contact of the lighttight film material 402″ with the stimulable phosphor sheet 1 cooperate with the conveying rollers 443, 443 to grasp, press and heat the stimulable phosphor sheet 1 and the lighttight film 402 cut from lighttight film material 402″, thereby to laminate the lighttight film 402. Instead of the lamination, the lighttight film 402 may be provided by coating of a lighttight substance. In this case, a coating composition comprising a binder and a lighttight substance such as carbon black dispersed therein may be coated onto the stimulable phosphor sheet 1 by use of a known coating means such as a roll coater, a knife coater, a doctor blade or a dip coater.

The stimulable phosphor sheet 1 on which the lighttight film 402 is provided in the manner as mentioned above is sent to the washing and sterilizing section 50. At the washing and sterilizing section 50, the stimulable phosphor sheet 1 is passed through the vessel 52 containing a washing and sterilizing liquid 51 such as an alcohol by being guided by rollers 53, 53, . . . and guide plates 54, 54, . . . , and the surfaces of the stimulable phosphor sheet 1 are washed and sterilized. The stimulable phosphor sheet 1 is then taken out of an outlet 7b of the case 7 and used for the image recording.

With this embodiment of the fourth radiation image read-out apparatus in accordance with the present invention wherein the lighttight film removal section 410 and the lighttight film forming section 440 are provided as well as the read-out section 20 and the erasing section 30, the image read-out can be carried out substantially for the stimulable phosphor sheet 1 for the dental image recording or the like provided with the lighttight film 402, instead of being housed in a cassette, and the stimulable phosphor sheet 1 can be reused efficiently. The components of this embodiment need not necessarily be housed in the same case, and a part of the components may be provided independently such that, for example, the lighttight film removal section 410 and the read-out section 20 are combined together, and the erasing section 30, the lighttight film forming section 440, and the washing and sterilizing section 50 are combined together. Also, a stacker capable of housing therein a plurality of the stimulable phosphor sheets 1, 1, . . . and feeding out the housed stimulable phosphor sheets 1, 1, . . . one by one may be provided between the lighttight film removal section 410 and the read-out section 20. In this case, removal of the lighttight films 402, 402, . . . from the stimulable phosphor sheets 1, 1, . . . can be carried out sequentially without waiting until the image read-out from a preceding stimulable phosphor sheet 1 is finished at the read-out section 20. The stacker may also be provided between the erasing section 30 and the lighttight film forming section 440. Also, the washing and sterilizing section 50 need not necessarily be provided.

In the case where the read-out section 120 shown in FIG. 5, the read-out section 220 shown in FIG. 6, or the read-out section 320 shown in FIG. 7 is utilized, the aforesaid supporting layer 5 of the stimulable phosphor sheet 1 must be transparent, and it is necessary for the lighttight film 402 to be provided on both surfaces of the stimulable phosphor sheet 1. Therefore, the lighttight film removal section 410 and the lighttight film forming section 440 are constituted to respectively peel off and provide the lighttight films 402, 402 on both surfaces of the stimulable phosphor sheet 1.

Figure 15:
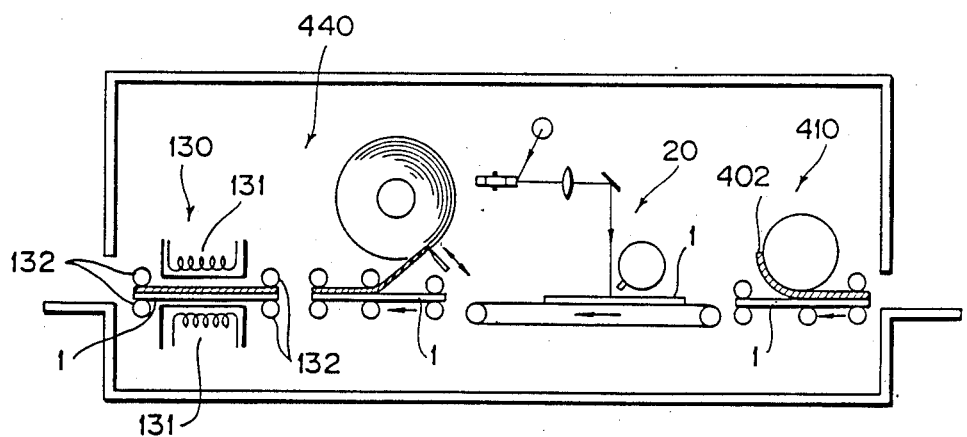
FIG. 15 is a schematic side view showing an embodiment of the fifth radiation image read-out apparatus in accordance with the present invention.

In the embodiment of the fourth radiation image read-out apparatus in accordance with the present invention shown in FIG. 12, the new lighttight film is provided on the stimulable phosphor sheet 1 after the erasing is carried out. However, as shown in FIG. 15, the lighttight film may be provided immediately after the image read-out is finished, and then the erasing may be carried out. In FIG. 15 showing an embodiment of the fifth radiation image read-out apparatus in accordance with the present invention, the lighttight film removal section 410 and the read-out section 20 are the same as those in the embodiment shown in FIG. 12. Also, the lighttight film forming section 440 is the same as in the embodiment shown in FIG. 12 except for the position thereof.

With reference to FIG. 15, after the lighttight film 402 is peeled off from the stimulable phosphor sheet 1 at the lighttight film removal section 410 and the image read-out from the stimulable phosphor sheet 1 is finished at the read-out section 20, the stimulable phosphor sheet 1 is sent to the lighttight film forming section 440, and a new lighttight film 402 is laminated on the surface of the stimulable phosphor sheet 1. The stimulable phosphor sheet 1 provided with the lighttight film 402 is then conveyed to the erasing section 130.

The erasing section 130 is provided with the nip rollers 132, 132, . . . for grasping both edge portions of the stimulable phosphor sheet 1, and the heaters 131, 131 facing the stimulable phosphor sheet 1, which is grasped by the nip rollers 132, 132, . . . , from above and below. The stimulable phosphor sheet 1 is disposed between the heaters 131, 131 as shown by being grasped by the nip rollers 132, 132, . . . , and is heated by the heaters 131, 131 to release the radiation energy remaining on the stimulable phosphor layer.

In the case where the erasing is carried out after the provision of the lighttight film 402, the erasing by the erasing light cannot be carried out, and therefore the erasing by heat is employed. The erasing by heat also effects sterilization of the stimulable phosphor sheet 1, and therefore an independent sterilizing means is not required. Therefore, after being cooled, the stimulable phosphor sheet 1 can be immediately used for the image recording.

An embodiment of the sixth radiation image read-out apparatus in accordance with the present invention will hereinbelow be described with reference to FIGS. 16, 17 and 18. In FIG. 16, similar elements are numbered with the same reference numerals with respect to FIGS. 1 and 8.

With reference to FIG. 16, the embodiment comprises a sheet take-out section 510, the read-out section 20, the erasing section 30, and a sheet loading section 540, which are housed in the case 7. As shown in FIG. 17, the stimulable phosphor sheet 1 from which an image is to be read out comprises the supporting layer 5, the stimulable phosphor layer 4 overlaid on the supporting layer 5, and the transparent protective layer 3 overlaid on the stimulable phosphor layer 4. The stimulable phosphor sheet 1 is enclosed in a lighttight envelope 9' which is permeable to radiation such as X-rays and which is constituted by a black sheet-shaped material. The stimulable phosphor sheet 1 is of the type used for dental image recording, and has a small size of 3 cm×4 cm.

After the dental image recording is carried out on the stimulable phosphor sheet 1 accommodated in the lighttight envelope 9' in an external image recording apparatus (not shown), the stimulable phosphor sheet 1 is fed to the radiation image read-out apparatus through an inlet 7a of the case 7, and conveyed to the sheet take-out section 510.

At the sheet take-out section 510, the lighttight envelope 9' accommodating the stimulable phosphor sheet 1 is conveyed by a pair of nip rollers 511, 511 and a pair of nip rollers 512, 512 to the predetermined position shown in FIG. 16. A push member 515 is provided in the vicinity of the nip rollers 511, 511. At the time the lighttight envelope 9' is conveyed, the push member 515 is retracted to the position indicated by the broken line. As shown in FIG. 18, a cutter 514 is provided by the side of the leading edge of the lighttight envelope 9' at the aforesaid predetermined position. When the lighttight envelope 9' accommodating the stimulable phosphor sheet 1 is located at the predetermined position, the cutter 514 is moved in the direction as indicated by the arrow A to cut the lighttight envelope 9' along the chain line and open the lighttight envelope 9'. At the same time, both side edge portions of the lighttight envelope 9' are grasped and held by a set of grasping plates 516, 516 and a set of grasping plates 517, 517 moved from the positions indicated by the broken line and the positions indicated by the solid line. After the leading edge of the lighttight envelope 9' is thus opened and the grasping plates 516, 516 and the grasping plates 517, 517 fix both side edge portions of the lighttight envelope 9', the push member 515 is moved up to the position indicated by the solid line in FIGS. 16 and 18. The push member 515 is then moved in the direction as indicated by the arrow B to push the stimulable phosphor sheet 1 toward the opening of the lighttight envelope 9' via the lighttight envelope 9'. At this time, as the lighttight envelope 9' is held by the the grasping plates 516, 516 and the grasping plates 517, 517, the stimulable phosphor sheet 1 is pushed out of the lighttight envelope 9'. The push member 515 continues to push the stimulable phosphor sheet 1 until the stimulable phosphor sheet 1 is grasped between nip rollers 513, 513, and the stimulable phosphor sheet 1 is then conveyed by the nip rollers 513, 513 to the read-out section 20 shown in FIG. 16. After the image read-out from the stimulable phosphor sheet 1 is finished at the read-out section 20, the stimulable phosphor sheet 1 is conveyed to the erasing section 30.

Before the stimulable phosphor sheet 1 for which the image read-out and the erasing have been finished in the manner as mentioned above is reused for the image recording, the stimulable phosphor sheet 1 is loaded into a new lighttight envelope 9' at the sheet loading section 540 adjacent to the erasing section 30.

The sheet loading section 540 is provided with an envelope housing means 541 which houses therein a plurality of empty lighttight envelopes 9', 9', ... each having an opening at one edge. The lighttight envelopes 9 , 9', ... are taken one by one out of the envelope housing means 541 by a suction cup 542. The lighttight envelope 9' thus taken out is conveyed by a conveyance means 543 comprising endless belts and rollers to a stimulable phosphor sheet inserting position. A suction roller 544 contacting the edge portion on the opening side of the lighttight envelope 9' located at the sheet inserting position starts suction and is moved up to broaden the opening of the lighttight envelope 9' at the time the lighttight envelope 9' is stopped at the predetermined position. The stimulable phosphor sheet 1 for which the erasing has been finished is then conveyed leftward into the lighttight envelope 9', and stopped at the position indicated by the solid line. A push member 545 is then moved from the position indicated by the solid line to the position indicated by the chain line, and is then moved leftward to push the stimulable phosphor sheet 1 leftward to the position indicated by the broken line. After the stimulable phosphor sheet 1 has been completely conveyed into the lighttight envelope 9', pressure means 546, 546 for heat sealing grasp the edge of the lighttight envelope 9' from above and below and seals the opening of the lighttight envelope 9'. After the stimulable phosphor sheet 1 is thus enclosed in the lighttight envelope 9', the endless belt as a part of the conveyance means 543 adjacent the sealed lighttight envelope 9' is retracted to the position indicated by the broken line, and the lighttight envelope 9' enclosing the stimulable phosphor sheet 1 is conveyed leftward by the conveyance means 543 and is ejected by conveying rollers 547, 547 from the outlet 7b of the case 7 for use in the image recording. The stimulable phosphor sheet 1 is used for the dental image recording, and therefore the lighttight envelope 9' accommodating the stimulable phosphor sheet 1 may be washed and sterilized prior to the use in the image recording.

With the embodiment of the sixth radiation image read-out apparatus in accordance with the present invention shown in FIG. 16 wherein the sheet take-out section 510 and the sheet loading section 540 are provided as well as the read-out section 20 and the erasing section 30, the image read-out can be carried out substantially for the stimulable phosphor sheet 1 for the dental image recording or the like accommodated in the lighttight envelope 9', instead of being housed in a cassette, and the stimulable phosphor sheet 1 can be reused efficiently. The components of this embodiment need not necessarily be housed in the same case, and a part of the components may be provided independently such that, for example, the sheet take-out section 510 and the read-out section 20 are combined together, and the erasing section 30 and the sheet loading section 540 are combined together. Also, a stacker capable of housing therein a plurality of the stimulable phosphor sheets 1, 1, . . . and feeding out the housed stimulable phosphor sheets 1, 1, . . . one by one may be provided between the sheet take-out section 510 and the read-out section 20. In this case, take-out of the stimulable phosphor sheets 1, 1, . . . from the lighttight envelopes 9', 9', . . . can be carried out sequentially without waiting until the image read-out from a preceding stimulable phosphor sheet 1 is finished at the read-out section 20. The stacker may also be provided between the erasing section 30 and the sheet loading section 540.

The configuration and the shape of the lighttight envelope 9' are not limited to those in the aforesaid embodiment, and the method of loading and take-out of the stimulable phosphor sheet 1 in the lighttight envelope 9' may be changed in accordance with the lighttight envelope 9'. For example, the lighttight envelope 9' may be prepared by securing the edges of two sheets by means of face-to-face fasteners referred to as magic tapes, and loading and take-out of the stimulable phosphor sheet 1 may be effected by engaging and disengaging the face-to-face fasteners.

In the embodiment of the sixth radiation image read-out apparatus in accordance with the present invention shown in FIG. 16, the stimulable phosphor sheet 1 is loaded into the new lighttight envelope 9' after the erasing is carried out. However, as shown in FIG. 19, the stimulable phosphor sheet 1 may be loaded into the new lighttight envelope 9' immediately after the image read-out is finished, and then the erasing may be carried out. In FIG. 19 showing an embodiment of the seventh radiation image read-out apparatus in accordance with the present invention, the sheet take-out section 510 and the read-out section 20 are the same as those in the embodiment shown in FIG. 16. Also, the sheet loading section 540 is the same as in the embodiment shown in FIG. 16 except for the position thereof.

With reference to FIG. 19, after the stimulable phosphor sheet 1 is taken out of the lighttight envelope 9' at the sheet take-out section 510 and the image read-out from the stimulable phosphor sheet 1 is finished at the read-out section 20, the stimulable phosphor sheet 1 is sent to the sheet loading section 540 and loaded into a new lighttight envelope 9'. The stimulable phosphor sheet 1 accommodated in the lighttight envelope 9' is then conveyed to the erasing section 130.

The erasing section 130 is provided with the nip rollers 132, 132, ... for grasping both edge portions of the lighttight envelope 9', and the heaters 131, 131 facing the lighttight envelope 9', which is grasped by the nip rollers 132, 132, ..., from above and below. The stimulable phosphor sheet 1 is disposed between the heaters 131, 131 as shown, and is heated by the heaters 131, 131 to release the radiation energy remaining on the stimulable phosphor layer.

In the case where the erasing is carried out after the loading of the stimulable phosphor sheet 1 into the lighttight envelope 9', the erasing by the erasing light cannot be carried out, and therefore the erasing by heat is employed. The erasing by heat also effects sterilization of the lighttight envelope 9' accommodating the stimulable phosphor sheet 1, and therefore an independent sterilizing means is not required. Therefore, after being cooled, the stimulable phosphor sheet 1 can be immediately used for the image recording.

In the stimulable phosphor sheet composite member comprising the stimulable phosphor sheet 1 and the lighttight layer (lighttight film) 2 shown in FIG. 2, the supporting layer 5 of the stimulable phosphor sheet 1 may be lighttight. Also, carbon black used as the lighttight substance in the lighttight layer 2 should preferably be dispersed in the binder so that the optical density of the lighttight layer 2 is not lower than 5. In this case, light shielding can be achieved efficiently.

In the steps from the image recording to the image read-out, the stimulable phosphor sheet 1 is maintained in the condition closely contacted with the lighttight layer 2 as shown in FIG. 2. Therefore, there is no risk of the stimulable phosphor layer 4 of the stimulable phosphor sheet 1 being stimulated by ambient light even though the stimulable phosphor sheet composite member is processed in daylight. Removal of the lighttight layer 2 may also be carried out by use of a removal means as shown in FIGS. 20 and 21.

The removal means shown in FIG. 20 is constituted so that the stimulable phosphor sheet composite member is passed through a solvent vessel 611 containing an alcohol 612 by being guided by a plurality of rollers 610, 610, ... rotated in the directions as indicated by the arrows, whereby the lighttight layer 2 is dissolved. The removal means shown in FIG. 21 is constituted so that a roller 613 capable of containing the alcohol 612 on the surface is rotated, and the stimulable phosphor sheet composite member is conveyed by nip rollers 614, 614 and nip rollers 615, 615 with the lighttight layer 2 contacting the roller 613, whereby the lighttight layer 2 is removed. As the stimulable phosphor sheet composite member in accordance with the present invention is small, removal of the lighttight layer 2 can be achieved very simply by use of the small solvent vessel 611. FIG. 22 shows the stimulable phosphor sheet 1 from which the lighttight layer 2 has been removed. In this condition, the stimulable phosphor sheet 1 can be stimulated by stimulating rays from the side of the protective layer 3, and subjected to the image read-out from the stimulable phosphor layer 4.

In the case where only the surface of the stimulable phosphor sheet 1 on the stimulable phosphor layer side is provided with the light shielding means, the stimulable phosphor sheet 1 can be substantially shielded from light. However, as shown in FIGS. 23A and 23B, a lighttight member 616 may be provided on each edge face of the stimulable phosphor sheet 1, and then the aforesaid lighttight layer may be provided on the surface of the stimulable phosphor sheet 1 on the stimulable phosphor layer side. In this case, the stimulable phosphor layer 4 can be shielded from light more reliably. The lighttight member 616 need not be soluble in a solvent as in the case of the aforesaid lighttight layer.

As shown in FIG. 23B, the lighttight member 616 should preferably be provided also between the protective layer 3 and the stimulable phosphor layer 4. In this case, even through light impinges upon the edge face of the transparent protective layer 3, the light can be prevented from being transmitted to the stimulable phosphor layer 4 through the protective layer 3.

The stimulable phosphor sheet 1 shown in FIG. 22 is provided the protective layer 3 only on one surface, and the stimulable phosphor sheets 1, 1 shown in FIGS. 23A and 23B are provided with the protective layers 3, 3 on both surfaces. However, the stimulable phosphor sheet composite member in accordance with the present invention need not necessarily be provided with the protective layer 3. Also, in the case where the stimulable phosphor layer 4 is self-supporting, the supporting layer 5 may be omitted. In the case where the detection of the light emitted by the stimulable phosphor layer 4 is carried out on the surface opposite to the stimulating ray irradiation side, the supporting layer 5 is formed of a transparent material. In the case where the stimulable phosphor layer 4 is self-supporting or the supporting layer 5 is not lighttight, the aforesaid lighttight layer should be provided also on the rear surface of the stimulable phosphor sheet 1.

Also, in the stimulable phosphor sheet composite member comprising the stimulable phosphor sheet 1 and the lighttight layer (lighttight sheet) 6 adhered to the protective layer 3 by use of the adhesive agent 8 as shown in FIG. 3, the supporting layer 5 of the stimulable phosphor sheet 1 may be lighttight. Also, carbon black used as the lighttight substance in the lighttight layer 6 should preferably be dispersed in the lighttight layer 6 so that the optical density of the lighttight layer 6 is not lower than 5. In this case, light shielding can be achieved efficiently. Removal of the lighttight layer 6 can also be effected by use of the removal means shown in FIG. 20. In this case, as the stimulable phosphor sheet composite member is passed through the solvent vessel 611, the alcohol 612 gradually penetrates through and dissolves the adhesive agent layer 8. At the time the stimulable phosphor sheet 1 comes out of the solvent vessel 611, the adhesive agent layer 8 is dissolved completely. Therefore, the lighttight layer 6 can readily be removed, for example, manually from the stimulable phosphor sheet 1 conveyed out of the solvent vessel 611. The lighttight layer 6 may also be allowed to fall into the solvent vessel 611 while the stimulable phosphor sheet composite member is being passed through the solvent vessel 611.

In this case, it is necessary to select the solvent from those capable of substantially dissolving the adhesive agent layer 8 and having no adverse effect on the stimulable phosphor layer 4 or the like. As such a solvent, the alcohol as well as the solvents enumerated above as the binder solvents may be utilized. Also, the materials enumerated above as the binder materials may be utilized to constitute the adhesive agent layer 8.

The lighttight layer 6 may also be formed of a lighttight material comprising a binder soluble in the aforesaid solvent and a lighttight substance dispersed in the binder, so that both the lighttight layer 6 and the adhesive agent layer 8 are soluble in the solvent. Also, in the case of the stimulable phosphor sheet composite member shown in FIG. 3, the lighttight member 616 may be provided as shown in FIGS. 23A and 23B.

Also, in the case where the lighttight envelope 9 shown in FIG. 4 is utilized, carbon black used as the lighttight substance in the lighttight layer 6 should preferably be contained in the PVAC or PVB so that the optical density of the lighttight envelope 9 is not lower than 5. In this case, light shielding can be achieved efficiently. Removal of the lighttight envelope 9 can also be effected by use of the removal means shown in FIG. 20. Moreover, it is necessary to select the solvent for the lighttight envelope 9 from those capable of substantially dissolving the specific envelope material and having no adverse effect on the stimulable phosphor layer 4 or the like. As such a solvent, the alcohol as well as the solvents enumerated above as the binder solvents may be utilized. Also, the materials enumerated above as the binder materials may be utilized as the envelope material. Furthermore, the shape of the lighttight envelope 9 may be changed in accordance with the shape of the stimulable phosphor sheet 1 so that the overall stimulable phosphor sheet 1 is enclosed in the lighttight envelope 9.

We claim:

1. A radiation image read-out apparatus comprising:
   (i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer, and
   (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light.

2. An apparatus as defined in claim 1 wherein said light shielding means is constituted by a lighttight film coated on said surface of said stimulable phosphor sheet on said stimulable phosphor layer side, and comprising a binder soluble in said solvent and a lighttight substance dispersed in said binder.

3. An apparatus as defined in claim 1 wherein said light shielding means is a lighttight sheet adhered to said surface of said stimulable phosphor sheet on said stimulable phosphor layer side by use of an adhesive agent soluble in said solvent.

4. An apparatus as defined in claim 1 wherein said light shielding means is a lighttight envelope soluble in said solvent and enclosing said stimulable phosphor sheet.

5. A radiation image read-out apparatus comprising:
   (i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer,
   (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light,
   (iii) an erasing section for erasing the radiation energy remaining on said stimulable phosphor layer by irradiating light to said stimulable phosphor sheet after the image read-out has been finished and/or by heating said stimulable phosphor sheet, and
   (iv) a light shielding means forming section for forming a light shielding means at least on the surface of said stimulable phosphor sheet, for which the erasing has been finished, on the stimulable phosphor layer side.

6. An apparatus as defined in claim 5 wherein said light shielding means is constituted by a lighttight film coated on said surface of said stimulable phosphor sheet on said stimulable phosphor layer side, and comprising a binder soluble in said solvent and a lighttight substance dispersed in said binder.

7. An apparatus as defined in claim 5 wherein said light shielding means is a lighttight sheet adhered to said surface of said stimulable phosphor sheet on said stimulable phosphor layer side by use of an adhesive agent soluble in said solvent.

8. An apparatus as defined in claim 5 wherein said light shielding means is a lighttight envelope soluble in said solvent and enclosing said stimulable phosphor sheet.

9. A radiation image read-out apparatus comprising:
   (i) a light shielding means removal section for removing a light shielding means by dissolution from a stimulable phosphor sheet comprising a stimulable phosphor layer and the light shielding means which is provided at least on a surface on the stimulable phosphor layer side and which is removable by dissolution in a solvent, said stimulable phosphor sheet carrying a radiation image stored on said stimulable phosphor layer, (ii) a read-out section for reading out said radiation image by exposing said stimulable phosphor sheet, from which said light shielding means has been removed, to stimulating rays which cause said stimulable phosphor sheet to emit light in proportion to the stored radiation energy, and photoelectrically detecting the emitted light, (iii) a light shielding means forming section for forming a light shielding means at least on the surface of said stimulable phosphor sheet, for which the image read-out has been finished, on the stimulable phosphor layer side, and (iv) an erasing section for erasing the radiation energy remaining on said stimulable phosphor layer of said stimulable phosphor sheet, on which said light shielding means has been formed, by heating said stimulable phosphor sheet.

10. An apparatus as defined in claim 9 wherein said light shielding means is constituted by a lighttight film coated on said surface of said stimulable phosphor sheet on said stimulable phosphor layer side, and comprising a binder soluble in said solvent and a lighttight substance dispersed in said binder.

11. An apparatus as defined in claim 9 wherein said light shielding means is a lighttight sheet adhered to said surface of said stimulable phosphor sheet on said stimulable phosphor layer side by use of an adhesive agent soluble in said solvent.

12. An apparatus as defined in claim 9 wherein said light shielding means is a lighttight envelope soluble in said solvent and enclosing said stimulable phosphor sheet.

13. A radiation image read-out apparatus comprising:
(i) a lighttight film removal section for peeling off and removing a first lighttight film from a stimulable phosphor sheet comprising a stimulable phosphor layer and the lighttight film which is provided on a surface on the stimulable phosphor layer side, said stimulable phosphor sheet carrying a radiation image stored on said stimulable phosphor layer, (ii) a read-out section for reading out said radiation image by exposing said stimulable phosphor sheet, from which said first lighttight film has been peeled off and removed, to stimulating rays which cause said stimulable phosphor sheet to emit light in proportion to the stored radiation energy, and photoelectrically detecting the emitted light, (iii) an erasing section for erasing the radiation energy remaining on said stimulable phosphor layer by irradiating light to said stimulable phosphor sheet after the image read-out has been finished and/or by heating said stimulable phosphor sheet, and (iv) a lighttight film forming section for providing a second lighttight film on the surface of said stimulable phosphor sheet, for which the erasing has been finished, on the stimulable phosphor layer side.

14. A radiation image read-out apparatus comprising:
(i) a lighttight film removal section for peeling off and removing a first lighttight film from a stimulable phosphor sheet comprising a stimulable phosphor layer and the lighttight film which is provided on a surface on the stimulable phosphor layer side, said stimulable phosphor sheet carrying a radiation image stored on said stimulable phosphor layer, (ii) a read-out section for reading out said radiation image by exposing said stimulable phosphor sheet, from which said first lighttight film has been peeled off and removed stimulating rays which cause said stimulable phosphor sheet to emit light in proportion to the stored radiation energy, and photoelectrically detecting the emitted light, (iii) a lighttight film forming section for providing a second lighttight film on the surface of said stimulable phosphor sheet, for which the image read-out has been finished, on the stimulable phosphor layer side, and (iv) an erasing section for erasing the radiation energy remaining on said stimulable phosphor layer of said stimulable phosphor sheet, on which said second lighttight film has been provided, by heating said stimulable phosphor sheet.

15. A radiation image read-out apparatus comprising:
(i) a sheet take-out section for taking a stimulable phosphor sheet, which is accommodated in a first lighttight envelope and carries a radiation image stored thereon, out of said envelope by opening said envelope, (ii) a read-out section for reading out said radiation image by exposing said stimulable phosphor sheet, which has been taken out of said first envelope, to stimulating rays which cause said stimulable phosphor sheet to emit light in proportion to the stored radiation energy, and photoelectrically detecting the emitted light, (iii) an erasing section for erasing the radiation energy remaining on said stimulable phosphor sheet by irradiating light to said stimulable phosphor sheet after the image read-out has been finished and/or by heating said stimulable phosphor sheet, and (iv) a sheet loading section for loading said stimulable phosphor sheet, for which the erasing has been finished, into a second lighttight envelope.

16. A radiation image read-out apparatus comprising:
(i) a sheet take-out section for taking a stimulable phosphor sheet, which is accommodated in a first lighttight envelope and carries a radiation image stored thereon, out of said envelope by opening said envelope, (ii) a read-out section for reading out said radiation image by exposing said stimulable phosphor sheet, which has been taken out of said first envelope, to stimulating rays which cause said stimulable phosphor sheet to emit light in proportion to the stored radiation energy, and photoelectrically detecting the emitted light, (iii) a sheet loading section for loading said stimulable phosphor sheet, for which the image read-out has been finished, into a seconds lighttight envelope, and (iv) an erasing section for erasing the radiation energy remaining on said stimulable phosphor sheet, which has been loaded into said second envelope, by heating said stimulable phosphor sheet.

17. A stimulable phosphor sheet composite member comprising:
(i) a stimulable phosphor sheet provided with a stimulable phosphor layer, and (ii) a lighttight layer overlaid on a surface of said stimulable phosphor sheet on the stimulable phosphor layer side by coating a lighttight material, which is composed of a binder soluble in a solvent and a lighttight substance dispersed in said binder, on said surface.

18. A stimulable phosphor sheet composite member comprising:
   (i) a stimulable phosphor sheet provided with a stimulable phosphor layer, and
   (ii) a lighttight layer adhered to a surface of said stimulable phosphor sheet on the stimulable phosphor layer side by use of an adhesive agent soluble in a solvent.

19. A stimulable phosphor sheet composite member comprising:
   (i) a stimulable phosphor sheet provided with a stimulable phosphor layer, and
   (ii) a lighttight envelope soluble in a solvent and enclosing said stimulable phosphor sheet.

* * * * *